United States Patent Office 3,427,166
Patented Feb. 11, 1969

3,427,166
STABILIZATION OF ANIMAL AND POULTRY FEEDS CONTAINING A TETRACYCLINE ANTIBIOTIC
Anthony Abbey, Jamesburg, Robert Berendt Fortenbaugh, Gladstone, and Irving Klothen, Princeton, N.J., assignors to American Cyanamid Company, Stamford, Conn., a corporation of Maine
No Drawing. Filed Jan. 21, 1964, Ser. No. 339,088
U.S. Cl. 99—2        11 Claims
Int. Cl. A23k 1/175

ABSTRACT OF THE DISCLOSURE

Stabilizing animal and poultry feeds containing an edible animal feedstuff and dried fermentation harvest mash solids containing a tetracycline antibiotic against losses in potency for extended periods of time by adding said fermentation mash and prior to harvest thereof, an effective amount of aluminum ion.

---

This invention relates to the stabilization of animal and poultry feed supplements and to animal and poultry feeds containing a tetracycline type antibiotic and more particularly is concerned with a novel process of preparing animal feed supplements and/or animal feeds which are stable upon prolonged storage against loss of antibiotic potency.

In recent years the use of antibiotics in animal feeds for improving growth characteristics and efficiency of feed utilization has become of considerable economic importance. One of the best of such procedures is described in the United States patent to Jukes No. 2,619,420 which involves the addition to animal feeds of the antibiotics produced by fermentation of an aqueous nutrient medium with the microrganism Streptomyces aureofaciens. In practice, the fermentation mash solids are harvested, after the fermentation has been continued for the requisite length of time, and dried. The dried harvest mash solids containing the antibiotic, usually chlortetracycline, can be used as an animal feed supplement or the solids may be blended with conventional animal feed materials to produce a nutritionally balanced growth-accelerating animal feed.

The use of the dried chlortetracycline-containing fermentation harvest mash solids as an animal or poultry feed supplement has from the beginning presented very vexing problems particularly the loss of potency of the antibiotic in the feed or feed supplement upon prolonged storage, particularly under conditions of relatively high temperature and humidity. This loss of antibiotic potency, and which frequently runs as high as 20% over a one-year storage period, has heretofore necessitated the addition of a suitable overage of dried harvest mash antibiotic-containing solids to the animal feed blend so as to maintain the antibiotic potency during storage. Such a procedure is unsatisfactory and among other things results in higher than desired manufacturing costs for these animal feed supplements.

Other methods for stabilizing feeds containing tetracycline antibiotics have been suggested. For example, it has been suggested to add the biologically inactive antibiotic 7-chloro-4-epi-tetracycline to the supplement to stabilize it against loss of potency. It has also been suggested that calcium hydroxide be admixed with the supplement and the mixture pelletized before adding it to the feed. While such methods have met with considerable success, they require additional processing steps, pelletizing equipment or preparation of rather expensive additives. Furthermore, to date, no entirely satisfactory method has been proposed whereby the supplement may be rendered stable by treatment during the preparation of the supplement itself prior to harvesting of the fermentation mash.

In commercial practice, a typical procedure for obtaining the dried harvest mash antibiotic-containing solids is carried out by harvesting the fermentation mash at the prevailing pH, that is about pH 6–8. A filter aid such as diatomaceous earth is then added and the solids are collected by filtration and dried. The dried filter cake containing chlortetracycline may be marketed as such or may be blended with conventional poultry or animal feed materials to produce a nutritionally balanced growth-accelerating antibiotic-containing animal feed. While this harvested product is stable, when it is admixed with feed and stored under normal conditions for prolonged periods a loss of potency occurs.

The present invention is based on the surprising discovery that if aluminum ion is added to the fermentation mash prior to harvest and the harvesting is thereafter carried out in a conventional manner, the resulting dried harvest mash solids containing the antibiotic are stable against losses in antibiotic potency for extended periods of time whether or not it is in the usual form of a dried cake or whether it is blended with conventional poultry or animal feed materials. Thus, the present invention provides for the first time a simple one-step process of stabilizing not only the animal feed supplement but the finished feed as well against losses in antibiotic potency. It is not known why this treatment imparts such striking stability to the feed supplement even when blended with conventional feed materials but it is believed that the aluminum binds the tetracycline type antibiotic in some physical or chemical manner rendering it stable against losses in potency.

To achieve the desired stabilization, aluminum ion may be supplied from any convenient source of organic or inorganic aluminum salt which is soluble, at least to some extent, in the aqueous fermentation liquor. While aluminum chloride and aluminum sulfate are preferred, aluminum acetate, aluminum bromide and the like may be used.

Generally, between about 0.6% and 5.0% of an aluminum salt based upon the volume of wet mash has been found effective in stabilizing the antibiotic supplement. However, greater or lesser quantities of aluminum salt may be used but with less advantage, and it has been found that the most effective results are obtained when from about 1.25% to about 2.50% of an aluminum salt is employed. While it has been found that addition of from 0.6% to 5.0% of aluminum salt generally produces an adjustment of the pH of the fermentation mash to the desirable value of from 2 to 4, where such pH adjustment is not achieved, a sufficient amount of an appropriate acid or base may be added.

It has also been observed that if the mash is heated following the addition of aluminum ion and subsequent neutralization, and before harvest, to a temperature of between about 90–100° C. for several minutes, usually at least five, additional stability is obtained in the feed supplement and in the finished feed.

The invention will be described in greater detail in conjunction with the following specific examples.

EXAMPLE 1

In the following tests the chlortetracycline control mash was prepared in accordance with conventional fermentation procedures such as described in United States Patent to Duggar No. 2,482,055, and using Streptomyces aureofaciens strain A–377. The chlortetracycline test mashes were prepared by withdrawing representative 100 ml. samples from the fermenttaion vats upon completion of fermentation and prior to harvesting. These 10 ml. samples were placed in beakers and the desired amount of aluminum salt in 20 ml. of water was admixed therewith. The pH value of these mixtures was generally found to be between pH 3.2–3.5. However, in those instances where this pH range was not achieved, a suitable acid or base was added to adjust the pH to within the desired range of pH 2–4. A sufficient amount of sodium hydroxide solution was then added to each mixture to adjust the pH thereof to a value of from 7.0 to 7.2. Then with continued stirring, the mixtures were heated to from 90° C.–100° C. and maintained at such temperature for about five minutes. The mixtures were cooled to about 25° C. and, where necessary, the pH readjusted to about 7.2. Approximately 1.5 grams of Celite No. 512 filter aid was introduced into the cool mixture and the entire mixture filtered through Whatman No. 1 filter paper previously coated with 1.5 grams of Celite No. 512. The filtrate was discarded and the filter cake transferred to a Petri dish and dried in a vacuum oven for 18 to 22 hours at about 48° C.–55° C. and 25 inches of vacuum. The dried filter cake was then ground to a fine uniform powder, resuspended in water to original treatment volume (130 ml.) and approximately 13 ml. (1/10 original mash volume) from each treatment was placed in a number of test tubes. Control samples for each treatment were simply capped and stored without the addition of feed thereto. However, to substantially identical samples from each treatment were added 10 grams of a commercially available poultry feed. An example of feed used, contained a minimum of 20% crude protein, minimum crude fat 4%, and maximum crude fiber 5% and contained the following ingredients:

Riboflavin supplement
D-activated animal sterol
Vitamin A oil
Meat and bone scrap
Soybean oil meal
Dehydrated alfalfa meal
Corn meal
Hominy feed
Wheat standard middlings
Feeding cane molasses
Low fluorine rock phospate, 2%
Calcium carbonate, 2%
Manganese sulfate, .0125%
Calcium pantothenate
Niacin
Animal fat (preserved with butylated hydroxyanisole)

All samples were stored at 56° C. for three days, then removed from storage and assayed microbiologically for chlortetracycline content.

The instant tests run at 56° C. in the presence of water with and without feed are accelerated tests designed to create severe conditions and produce results one would expect to obtain on prolonged storage (i.e., a year or more) under normal conditions. The results obtained are provided in Table 1 below.

TABLE 1

| Preparation of Supplement by Fermentation Process and by Instant Invention—Filtered and Dried | | | | Prep. of Samples for Tests—Filter Cake Resuspended in 130 ml. H₂O, ml./test tube | Microbioassay Test Tube Contents, mcg. CTC/Test Tube—Plain and With Poultry Feed Added After 3 Days' Storage at 56° C | |
|---|---|---|---|---|---|---|
| Ml. Mash | Additive | Heat, °C./min. | Filter Aid | | Plain, No Feed Added | Feed Added, 10 g. per test tube |
| 100 ml. CTC | None | None | Celite 512 | 13 | 70,000 | 23,500 |
| 100 ml. CTC | None, adj. to pH 3.2 with HCl. | 90–100/5 | do | 13 | 58,000 | 28,250 |
| 100 ml. CTC | None | 90–100/5 | do | 13 | 70,500 | 32,200 |
| 100 ml. CTC | 1.25% AlCl₃ | None | do | 13 | 49,150 | 40,250 |
| 100 ml. CTC | 1.25% AlCl₃ | 90–100/5 | do | 13 | 45,250 | 42,700 |
| 100 ml. CTC | 1.25% AlCl₃ | 90–100/5 | do | 13 | 49,750 | 48,250 |
| 100 ml. CTC | 1.25% AlCl₃ | 90–100/5 | do | 13 | 55,250 | 49,500 |
| 100 ml. CTC | 1.6% Al₂(SO₄)₃ | 90–100/5 | do | 13 | 56,000 | 50,750 |

From the data provided in Table 1 above, it is evident that:

(1) Admixture of animal or poultry feed with chlortetracycline-containing supplements produces instability and acute loss of potency of the antibiotic under stress conditions at 56° C.;

(2) Chlortetracycline-containing feed supplements prepared in accordance with the instant invention are significantly more stable in the presence of animal or poultry feeds than those prepared by conventional procedures, e.g., without addition of aluminum ion and/or heat;

(3) Heating of the mash prior to harvesting produces increased stability of the mash regardless of whether the mash is produced by the conventional process or by the process of the instant invention;

(4) The stability of the supplement achieved by use of aluminum ion in the preparation thereof is augmented by the use of heat in the preparation prior to harvesting.

EXAMPLE 2

Following the procedure set forth in Example 1, chlortetracycline, oxytetracycline and tetracycline antibiotic feed supplements were prepared with various concentrations of aluminum chloride used in the fermentation treatment prior to harvesting of the mash. The filter cakes obtained were dried, ground and resuspended in water. For the accelerated test system, 13 ml. samples from each treatment were placed in test tubes and the test tubes capped and stored at 56° C. Likewise, similar 13 ml. samples from each treatment were placed in test tubes with 10 grams of poultry feed as used in Example 1. These samples were capped and stored with the others at 56° C. for three days and thereafter all samples were removed and assayed microbiologically for antibiotic content.

The results obtained are provided in Table 2 below, where it can be readily seen that in these accelerated tests, the antibiotic-containing supplements prepared by conventional methods were unstable when stored in admixture with feed and water. Additionally, it can be seen that all supplements prepared by the process of the instant invention were very stable even when stored under the most adverse conditions of the test. It can be further noted that the use of 1.25% to 2.5% of AlCl₃ in the preparation of the various supplements produced maximum stability of the supplement.

TABLE 2

| Preparation of Supplement by Fermentation Process and by Instant Invention—Filtered and Dried | | | | Prep. of Samples for Tests—Filter Cake Resuspended in H₂O, ml./test tube | Microbioassay Test Tube Contents, mcg. antibiotic/Test Tube—Plain and With Poultry Feed Added After 3 Days' Storage at 56° C | |
|---|---|---|---|---|---|---|
| Ml. Mash | Additive | Heat, °C./min. | Filter Aid | | Plain, No Feed Added | Feed Added, 10 g. per test tube |
| 100 ml. CTC [1] | None | 90–100/5 | 3 g. Celite 512 | 13 | 38,000 | 8,500 |
| 100 ml. CTC | 2.5% AlCl₃ | 90–100/5 | do | 13 | 26,500 | 24,625 |
| 100 ml. CTC | 0.625% AlCl₃ | 90–100/5 | do | 13 | 42,250 | 25,225 |
| 100 ml. CTC | 1.25% AlCl₃ | 90–100/5 | do | 13 | 34,375 | 27,850 |
| 100 ml. OTC [2] | None | 90–100/5 | do | 13 | 11,325 | 3,375 |
| 100 ml. OTC | 0.625% AlCl₃ | 90–100/5 | do | 13 | 13,300 | 8,075 |
| 100 ml. OTC | 1.25% AlCl₃ | 90–100/5 | do | 13 | 15,400 | 12,150 |
| 100 ml. OTC | 2.5% AlCl₃ | 90–100/5 | do | 13 | 14,925 | 12,250 |
| 100 ml. TC [3] | None | 90–100/5 | do | 13 | 11,650 | 5,600 |
| 100 ml. TC | 0.625% AlCl₃ | 90–100/5 | do | 13 | 10,500 | 6,100 |
| 100 ml. TC | 1.25% AlCl₃ | 90–100/5 | do | 13 | 9,325 | 8,150 |
| 100 ml. TC | 2.5% AlCl₃ | 90–100/5 | do | 13 | 8,325 | 8,750 |

[1] Chlortetracycline.  [2] Oxytetracycline.  [3] Tetracycline.

EXAMPLE 3

Following the procedure set forth in Example 1, four chlortetracycline feed supplements or mashes were prepared and tested. Comparative data obtained by microbiological assay of each supplement is provided in Table 3 below.

From these data it is evident that the addition of AlCl₃ to mash prior to harvesting produces increased stability of the mash. It also shows that commercial filter aids, other than Celite may be used successfully in the preparation and recovery of the mash.

TABLE 3

| Preparation of Supplement by Fermentation Process and by Instant Invention—Filtered and Dried | | | | Prep. of Samples for Tests—Filter Cake Resuspended in H₂O, ml./test tube | Microbioassay Test Tube Contents, mcg. CTC/Test Tube—Plain and With Poultry Feed Added After 3 Days' Storage at 56° C | |
|---|---|---|---|---|---|---|
| Ml. Mash | Additive | Heat, °C./min. | Filter Aid | | Plain, No Feed Added | Feed Added, 10 g. per test tube |
| 100 ml. CTC | None | 90–100/5 | 3% Celite 512 | 13 | 67,750 | 34,250 |
| 100 ml. CTC | 1.25% AlCl₃ | 90–100=5 | do | 13 | 60,250 | 51,500 |
| 100 ml. CTC | 1.25% AlCl₃ | 90–100=5 | 2.4% Dicalite 436 | 13 | 64,500 | 56,000 |

EXAMPLE 4

Following the procedure of Example 3 and employing similar ratios of ingredients, but on a pilot scale, essentially identical feed supplements were prepared. These supplements were assayed microbiologically and the data obtained is given in Table 4 below.

From the data it can be seen that supplements prepared on a pilot scale are essentially similar to those obtained with preparations on a smaller scale.

TABLE 4

| Pilot Plant Preparation of Supplement by Fermentation Process and by Instant Invention—Filtered and Dried | | | | Prep. of Samples for Tests—Filter Cake Resuspended in H₂O, ml./test tube | Microbioassay Test Tube Contents, mcg. CTC/Test Tube—Plain and With Poultry Feed Added After 3 Days' Storage at 56° C | |
|---|---|---|---|---|---|---|
| Mash | Additive | Heat, °C./min. | Filter Aid | | Plain, No Feed Added | Feed Added, 10 g. per test tube |
| 100 ml. CTC mash taken from vats for test purposes. | None | 90–100/5 | 3% Celite 512 | 13 | 63,750 | 25,300 |
| Do | 1.25% AlCl₃ | 90–100/5 | do | 13 | 58,500 | 50,750 |
| Do | 1.25% AlCl₃ | 90–100/5 | do | 13 | 63,250 | 48,750 |

We claim:

1. A process for the production of a dried fermentation harvest mash solids animal feed supplement containing a tetracycline antibiotic which comprises adding to a fermentation mash containing said antibiotic and prior to harvest thereof an effective amount of aluminum ion in a quantity sufficient to stabilize the antibiotic against losses in potency for extended periods of time when the supplement is incorporated into a major amount of an edible animal feedstuff.

2. A process according to claim 1 in which an aluminum salt is used as the source of aluminum ion and in which the salt is present to the extent of between about 0.5–5% based on the weight of the fermentation mash.

3. A process according to claim 1 in which the tetracycline antibiotic is chlortetracycline.

4. A process according to claim 1 in which the tetracycline antibiotic is tetracycline.

5. A process according to claim 1 in which the tetracycline antibiotic is oxytetracycline.

6. A process according to claim 1 in which the tetracycline antibiotic is demethylchlortetracycline.

7. A process for the production of an animal feed composition comprising an edible animal feedstuff containing an antibiotic produced by elaboration of a microorganism of the group consisting of Streptomyces aureofaciens and Streptomyces rimosus which comprises adding to a fermentation mash containing said antibiotic and prior to harvest thereof an effective amount of aluminum ion in a quantity sufficient to stabilize whereby the antibiotic in said fermentation mash solids and adding said mash to a major amount of an edible animal feedstuff whereby said feedstuff will be stable against losses in potency for extended periods of time.

8. A process according to claim 7 in which the antibiotic is chlortetracycline.

9. A process according to claim 7 in which the antibiotic is tetracycline.

10. A process according to claim 7 in which the antibiotic is oxytetracycline.

11. A process according to claim 7 in which the antibiotic is demethylchlortetracycline.

References Cited

UNITED STATES PATENTS

| | | | |
|---|---|---|---|
| 2,847,471 | 8/1958 | Vandeputte et al. | 195—80 X |
| 2,878,289 | 3/1959 | McCormick et al. | 99—2 X |
| 3,122,578 | 2/1964 | Remmers et al. | 167—65 X |
| 3,157,512 | 11/1964 | Muller | 99—2 X |

FOREIGN PATENTS

| | | |
|---|---|---|
| 548,652 | 11/1957 | Canada. |
| 814,671 | 6/1959 | Great Britain. |

RAYMOND N. JONES, *Primary Examiner.*

H. H. KLARE, III, *Assistant Examiner*

U.S. Cl. X.R.

99—4; 424—227